(12) United States Patent
Howcroft et al.

(10) Patent No.: US 9,106,937 B2
(45) Date of Patent: *Aug. 11, 2015

(54) SYSTEM AND METHOD OF INDICATING QUALITY OF SERVICE

(71) Applicant: AT&T Intellectual Property I, L.P., Atlanta, GA (US)

(72) Inventors: Jerald R. Howcroft, Beverly Hills, MI (US); Zhi Li, San Ramon, CA (US); Christine E. Bouamalay, Oakland, CA (US); Jeffrey Multach, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 37 days.

This patent is subject to a terminal disclaimer.

(21) Appl. No.: 13/851,518

(22) Filed: Mar. 27, 2013

(65) Prior Publication Data

US 2013/0219421 A1 Aug. 22, 2013

Related U.S. Application Data

(63) Continuation of application No. 11/800,967, filed on May 8, 2007, now Pat. No. 8,438,604.

(51) Int. Cl.
*H04N 7/173* (2011.01)
*H04N 21/24* (2011.01)
*H04N 17/00* (2006.01)
*H04N 21/422* (2011.01)

(52) U.S. Cl.
CPC ......... *H04N 21/2407* (2013.01); *H04N 17/004* (2013.01); *H04N 21/42209* (2013.01)

(58) Field of Classification Search
None
See application file for complete search history.

(56) References Cited

U.S. PATENT DOCUMENTS

| 7,206,646 | B2 | 4/2007 | Nixon et al. | |
|---|---|---|---|---|
| 7,328,261 | B2 * | 2/2008 | Husain et al. | 709/224 |
| 2002/0054750 | A1 * | 5/2002 | Ficco et al. | 386/46 |
| 2002/0155816 | A1 | 10/2002 | Fodor et al. | |
| 2003/0095555 | A1 * | 5/2003 | McNamara et al. | 370/401 |
| 2004/0152423 | A1 | 8/2004 | Reznik | |
| 2005/0053159 | A1 | 3/2005 | Sugimoto | |
| 2005/0114879 | A1 * | 5/2005 | Kamieniecki | 725/15 |
| 2005/0138459 | A1 * | 6/2005 | Yoon et al. | 713/600 |
| 2005/0166222 | A1 | 7/2005 | Tully, Jr. et al. | |
| 2005/0273809 | A1 | 12/2005 | Kendall et al. | |
| 2006/0132458 | A1 | 6/2006 | Garfio et al. | |
| 2006/0283697 | A1 | 12/2006 | Garfio | |
| 2007/0047542 | A1 * | 3/2007 | Thukral | 370/389 |
| 2007/0050836 | A1 * | 3/2007 | Stanek et al. | 725/131 |
| 2008/0066145 | A1 | 3/2008 | Molen et al. | |
| 2008/0162204 | A1 | 7/2008 | Kaiser et al. | |
| 2008/0278627 | A1 | 11/2008 | Howcroft et al. | |

* cited by examiner

*Primary Examiner* — Chenea Smith
(74) *Attorney, Agent, or Firm* — Toler Law Group, PC (57) ABSTRACT

A method includes sending a polling message from a management system to a set-top box device. The polling message requests service data related to quality of service associated with the set-top box device. The method includes receiving, at the management system, quality parameters from the set-top box device in response to the polling message. The method includes selecting a representative color that corresponds to the quality of service. The method also includes sending a quality indicator from the management system to a display. The quality indicator displays the representative color and an identification of the set-top box device.

20 Claims, 11 Drawing Sheets

| Parameter | Red Value | Green Value | Yellow Value |
|---|---|---|---|
| *STB and Server Side Parameters* | | | |
| MAC | No value | Value present | |
| Boot Server | No value | Value present | |
| STB GUID | No value | Value present | |
| IP Address | No value | Value present | |
| CPU Utilization | Configurable threshold / 100% over period of time | Configurable threshold | Configurable threshold |
| IPTV Client Version | No value | Value present | |
| Boot ROM Version | No value | Value present | |
| Hard Drive Capacity (DVR) | Won't allow new recording | Allows new recordings | Only allows partial recording |
| R-UDP Successful Retransmissions | | 0 | > 0 |
| R-UDP Unsuccessful Re-transmissions | > 0 | 0 | |
| Packet Loss | | 0 | > 0 |
| No. of Large Holes During Interval | ≥ 1 | 0 | |
| Decoder Buffer Underflow / Re-buffering Events | ≥ 1 | 0 | |
| Decoder Buffer Overflow Events | ≥ 1 | 0 | |
| Number of I-frames Lost or I-frame Decoding Errors | ≥ 1 | 0 | |
| MPEG Stream Discontinuity Count | | 0 | > 0 |
| AV_Decode_Error | | 0 | > 0 |
| AV_DRM_Error | | 0 | > 0 |
| *Server Side Only Parameters* | | | |
| G2?LDAP Activation Date | No value / account suspended | Value present and account active | |
| Hard Drive Present (DVR) | | At least 1 STB per account = yes | |

SYSTEM AND METHOD OF INDICATING QUALITY OF SERVICE

PRIORITY CLAIM

This application is a continuation of, and claims priority to, U.S. Patent Application No. 11/800,967 filed on May 8, 2007, which is hereby incorporated by reference in its entirety.

FIELD OF THE DISCLOSURE

The present disclosure is generally related to indicating quality of service.

BACKGROUND

Tracking quality of service is an important aspect of Internet Protocol (IP) based technologies. Even network disturbances that can be easily remedied can have significant impacts on video, voice and data communications. While some network devices, such as set-top box devices, may show software versions and basic network status information, they do not show quality of service information in a manner that quickly illustrates video quality status, for example, and that allows technicians or network service providers to easily identify categories of service quality over large numbers of network devices. Hence, there is a need for an improved system and method of indicating quality of service.

DETAILED DESCRIPTION

A set-top box device is disclosed that includes a processor and a memory accessible to the processor. The memory includes logic to activate at least one video quality indicator in a color selected from a plurality of colors, where the selected color corresponds to a quality of video content received at the set-top box device via a video distribution network.

A system to indicate video quality is disclosed and includes a network interface communicating with a video distribution network. The system also includes logic to receive data from a set-top box device indicating a quality of video content received at the set-top box device via the video distribution network. Further, the system includes logic to send a first graphical user interface (GUI) to a display device communicating with the remote management system, wherein the GUI displays a video quality indicator associated with the set-top box device, the GUI having a color that corresponds to the quality of video content received by the set-top box device.

In another embodiment, a method of indicating quality of service is disclosed and includes determining values of a plurality of video quality parameters at a set-top box device. The method also includes selecting a color from a plurality of colors based on at least one of the values. The method also includes activating a video quality indicator, wherein the video quality indicator includes the selected color.

In another embodiment, a method of indicating quality of service is disclosed and includes receiving data at a remote management system from a set-top box device, the data indicating a quality of service received by the set-top box from a video distribution network. The method also includes sending a graphical user interface (GUI) to a display device communicating with the remote management system, wherein the GUI includes a quality of service indicator having a color that corresponds to the quality of service.

In another embodiment, a computer-readable medium is disclosed and includes processor-readable instructions adapted to cause a processor to execute a method comprising determining values of a plurality of video quality parameters; selecting a color from a plurality of colors based on at least one of the values; and activating a video quality indicator, wherein the video quality indicator includes the selected color.

Figure 1:
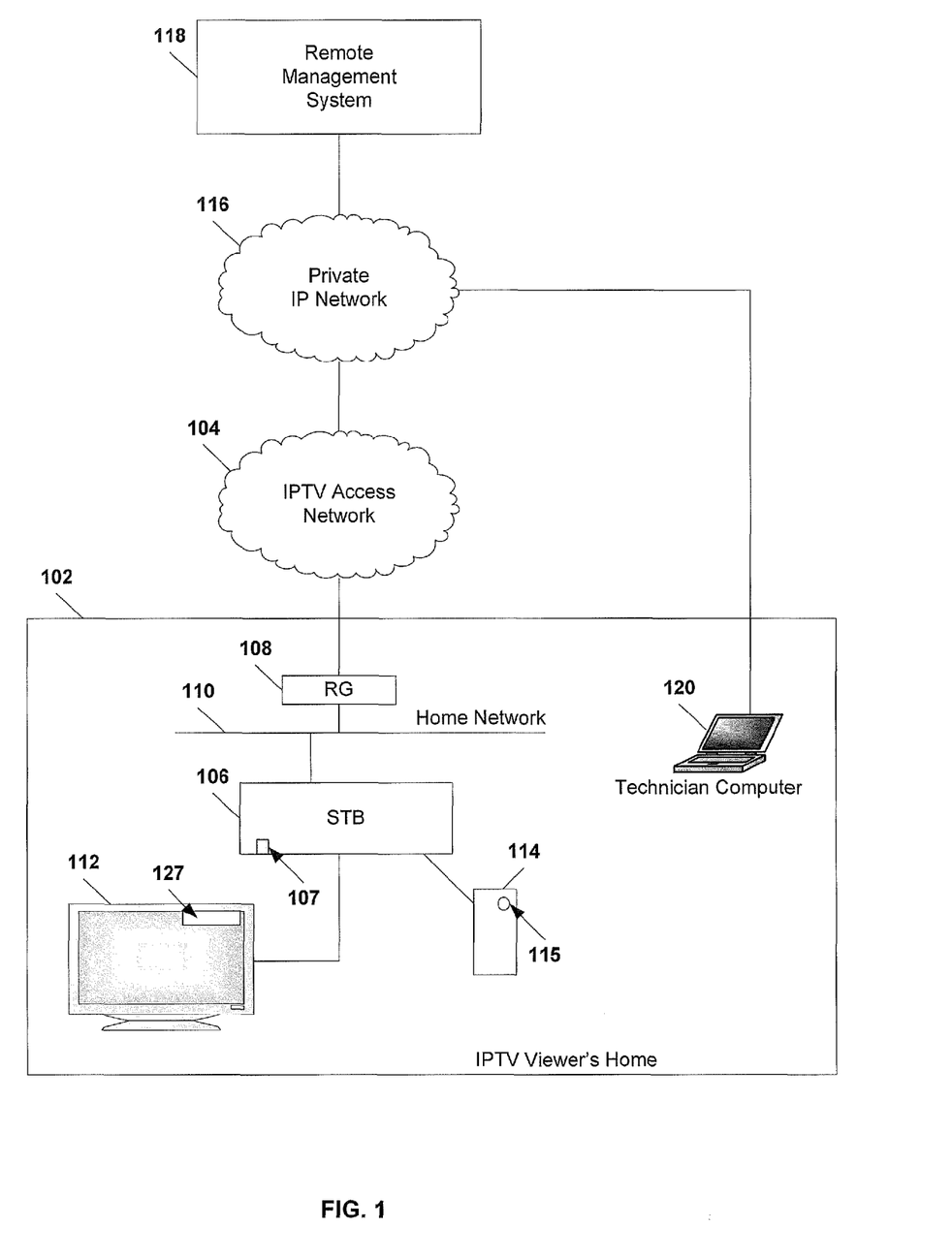
FIG. 1 is a block diagram of a particular embodiment of a system to indicate quality of service.

Referring to FIG. 1, a block diagram of a particular embodiment of a system to indicate quality of service is illustrated and designated generally 100. The system includes a premise, such as an Internet Protocol Television (IPTV) viewer's home 102, which receives video content via a video distribution network, such as an IPTV access network 104. In a particular embodiment, the IPTV viewer's home 102 can include a set-top box device 106 that communicates with the IPTV access network 104 via customer premises equipment, such as a residential gateway (RG) 108. In an illustrative embodiment, the set-top box device 106 can communicate with the residential gateway 108 via a home network 110. In an illustrative, non-limiting embodiment, the home network 110 can also facilitate communication between the IPTV access network 104 and other communication devices, such as a Voice-over Internet Protocol (VoIP) phone, a computing device, or a combination thereof.

In a particular embodiment, the set-top box device 106 can include at least one video quality indicator 107. The set-top box device 106 is coupled to a display device, such as a television. The set-top box device 106 can be controlled remotely by a remote control device 114. In one embodiment, the remote control device can include a video quality indicator 115.

Further, the set-top box device 106 communicates with a remote management system 118 that can receive and store video quality data from the set-top box device 106. In a particular embodiment, the remote management system 118 can communicate with the IPTV access network 104 via a private IP network 116. In an illustrative embodiment, other parties may communicate with the remote management system 118 to receive video quality data related to the set-top box device 106. For example, a technician that is within or outside the IPTV viewer's home 102 can communicate with the remote management system 118 via the private IP network 116, the IPTV access network 104, or a combination thereof.

Figure 8:
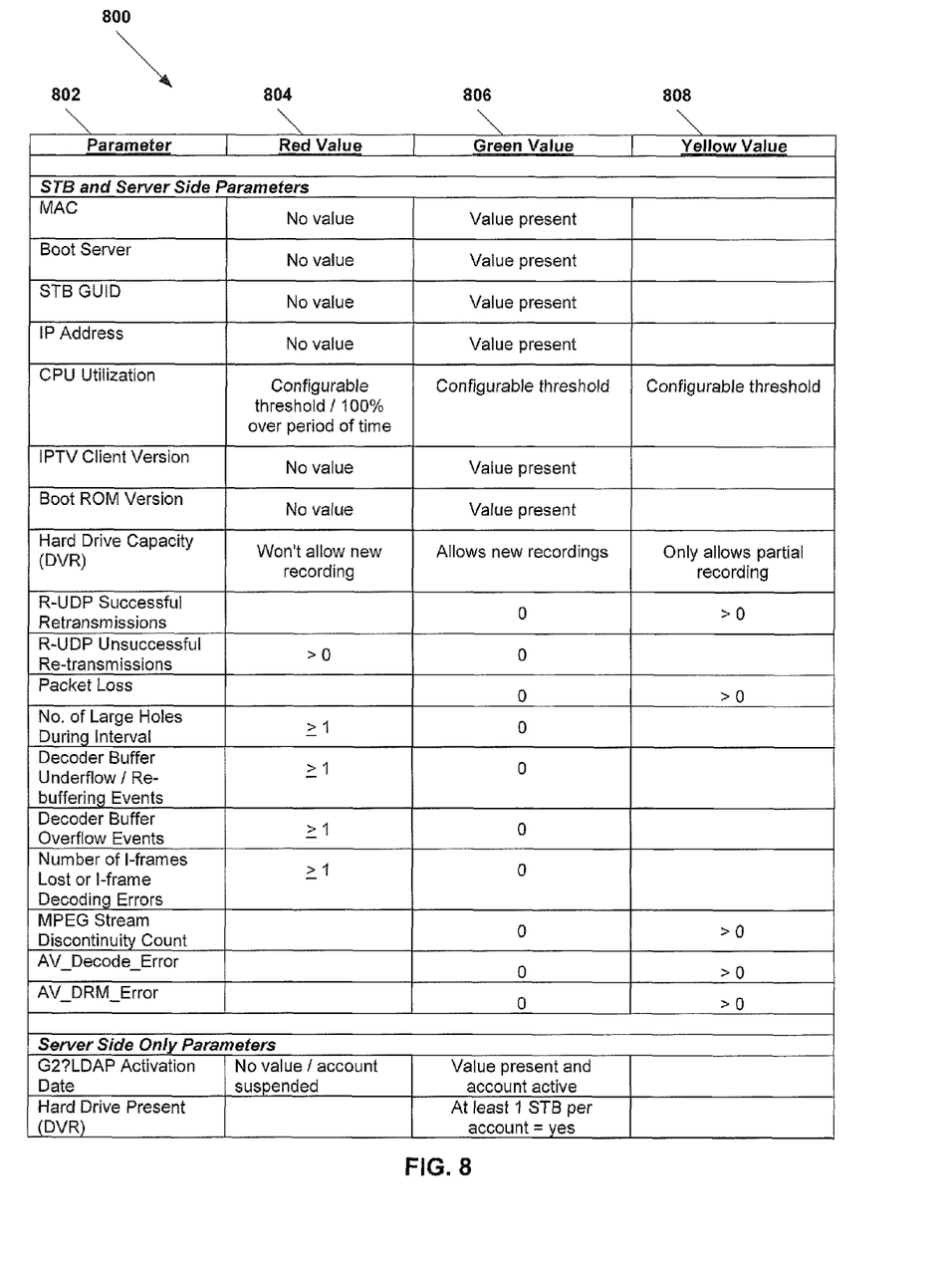
FIG. 8 is a diagram of a particular embodiment of a data structure related to indicating quality of service.

In a particular illustrative embodiment, the set-top box device 106 stores a plurality of parameters, such as video quality parameters, that indicate a quality of service received by the set-top box device 106 via the IPTV access network 104. A data structure illustrating examples of such parameters is illustrated in FIG. 8. The set-top box device 106 determines and stores values of each of the video quality parameters on a rolling basis and can store values related to a particular time interval. For example, the set-top box device 106 can determine values for the video quality parameters on a rolling basis and store such values determined over the immediately preceding twenty-four hour period.

In an illustrative embodiment, aspects of determining values for the video quality parameters, including video quality parameters, value determination intervals, rolling storage periods, how and when values of one or more parameters are reset, other aspects of determining such values, or any combination thereof, can be configurable by the viewer, the technician, an IPTV service provider, or any combination thereof. For example, such aspects can be configurable with respect to the set-top box device 106, a geographic area that includes the set-top box device 106, a plurality of particular set-top boxes communicating with the IPTV access network 104, or any combination thereof.

The set-top box device 106 can select a color from a plurality of colors based on at least one of the video quality parameter values. In one embodiment, the color can indicate a category of overall quality of video content received via the IPTV access network 104. Categories of video content quality can correspond to a degree to which viewing of video content at a display device 112 coupled to the set-top box device 106 is impaired. For example, categories of video content quality can indicate whether gaps or delays are present in the video content, whether refresh rates appear seamless, whether video content appears distorted (e.g., having a plurality of squares making up portions of the video content), whether audio accompanying the video content is distorted, delayed or lost, other factors, or any combination thereof.

In a particular embodiment, the set-top box device 106 can select a first color indicating a first video quality or other quality of service category, or a second color indicating a second video quality or other quality of service category based on the video quality parameter values. For example, the set-top box device can select a red color to indicate poor video quality or a green color to indicate good video quality. In another example, the set-top box device 106 can select a third color, such as an amber or yellow color, to indicate a third video quality or other quality of service category, such as a questionable, sub-par or average video quality, or video quality that otherwise does not fall within the good or poor categories. In an illustrative embodiment, a color indicating good video quality can be selected at all times except when one or more particular video quality parameter values are within a pre-defined yellow or red range. An example data structure illustrating ranges of parameters is illustrated in FIG. 8.

Categorizations of video quality as good, poor, average, or otherwise, based on video quality parameter values, can be pre-defined within software stored at the set-top box device 106. In another embodiment, categorizations of video quality based on video quality parameter values can be configurable for the set-top box device 106, for a geographic area including the set-top box device 106, for another plurality of set-top box devices, or any combination thereof.

The set-top box device 106 activates a video quality indicator that includes the selected color. For example, the set-top box device 106 can activate a light-emitting indicator 107 at the set-top box device 106 in the selected color or one of a plurality of video quality indicators at the set-top box device 106 in the selected color. In another example, the set-top box device 106 can send an instruction to the remote control device 114 to illuminate a light-emitting video quality indicator 115 at the remote control device 114 in the selected color. In a particular embodiment, the set-top box device 106 can send data indicating the selected color to the remote control device.

Figure 9:
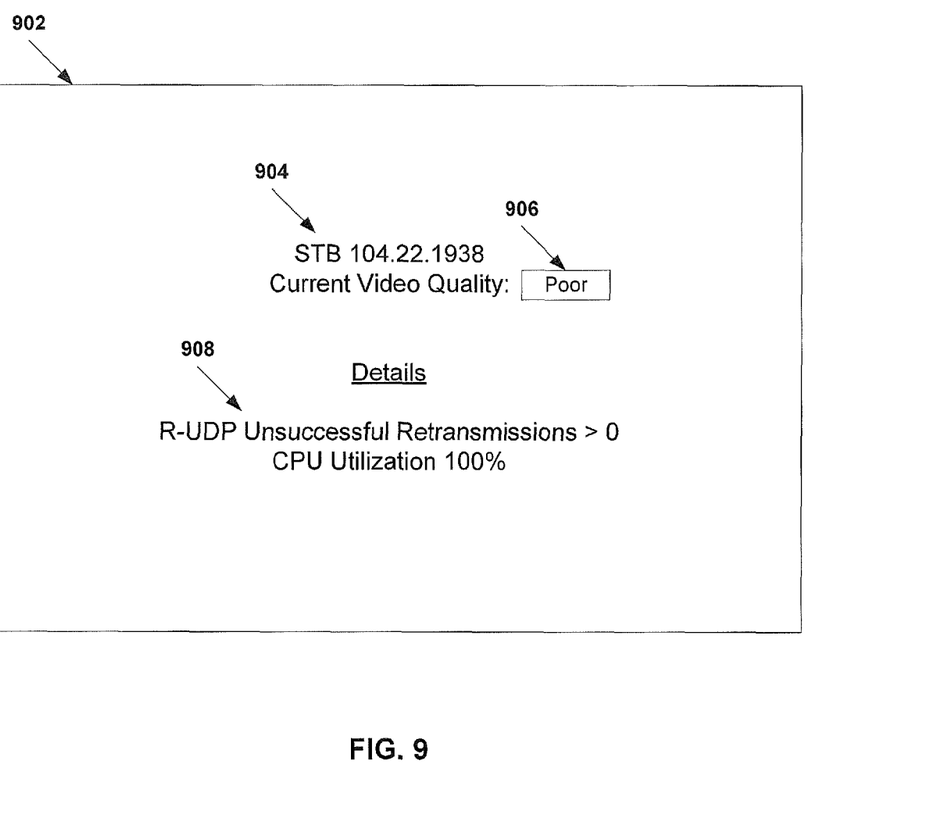
FIG. 9 is a diagram of a particular embodiment of a graphical user interface related to indicating quality of service.

In still another example, the set-top box device 106 can send a graphical video quality indicator 127 including the selected color to the display device 112. The set-top box device 106 can send the graphical video quality indicator 127 in the selected color to the display device 112 with video content, such that the graphical video quality indicator 127 is shown at a corner of the screen. Further, where the graphical video quality indicator 127 indicates poor or average video quality, for example, the graphical indicator 127 can be selectable to view a graphical user interface indicating video quality parameters, values, or any combination thereof, that are within ranges that trigger a red or yellow video quality indicator, for instance. Alternatively, the set-top box device 106 can send the graphical video quality indicator 127, the graphical user interface indicating reasons for a yellow or red graphical video quality indicator, or any combination thereof, to the display device 112 in response to a request received at the set-top box device 106 via a system menu or other menu accessible via the set-top box device 106. An example of such a graphical user interface is illustrated in FIG. 9.

In a particular embodiment, the set-top box device 106 can receive a polling message or other request from the remote management system 118 for data related to video quality or other quality of service received at the set-top box device 106 via the IPTV access network 104. The set-top box device 106 can send data indicating overall video quality, data indicating values of video quality parameters, data indicating a color selected at the set-top box device 102, or any combination thereof, to the remote management system 118. In one embodiment, the remote management system 118 can select a color based on video quality parameter values received from the set-top box device 106. In another embodiment, the remote management system 118 can receive data indicating a color selected by the set-top box device 106.

Figure 7:
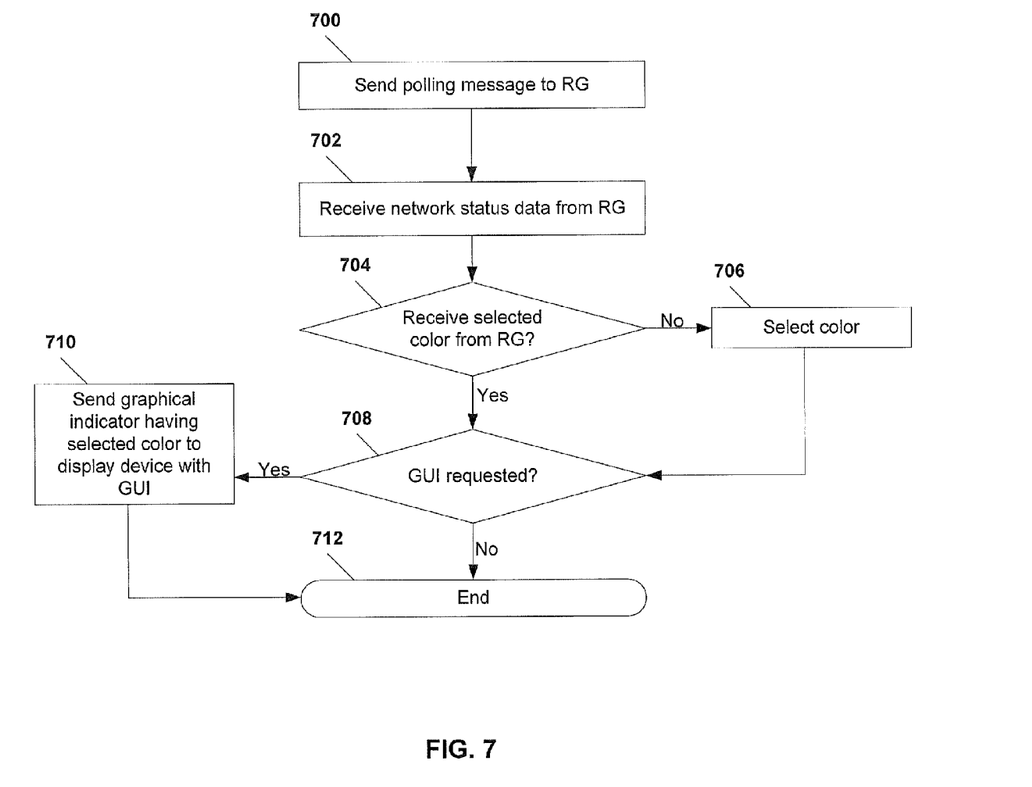
FIG. 7 is a flow diagram of a fifth particular embodiment of a method of indicating quality of service.

In an illustrative embodiment, a video quality indicator can be displayed at a display device that is coupled to the remote management system 118 or that communicates with the remote management system 118 via the private IP network, the IPTV access network, or the public Internet. For example, the remote management system 118 can send a graphical user interface (GUI) that includes a video quality indicator having the selected color to the technician computer 120. In an illustrative embodiment, the remote management system 118 can send the GUI to the technician computer 120 in response to a request for the GUI. An example of such a GUI is illustrated in FIG. 7.

Figure 10:
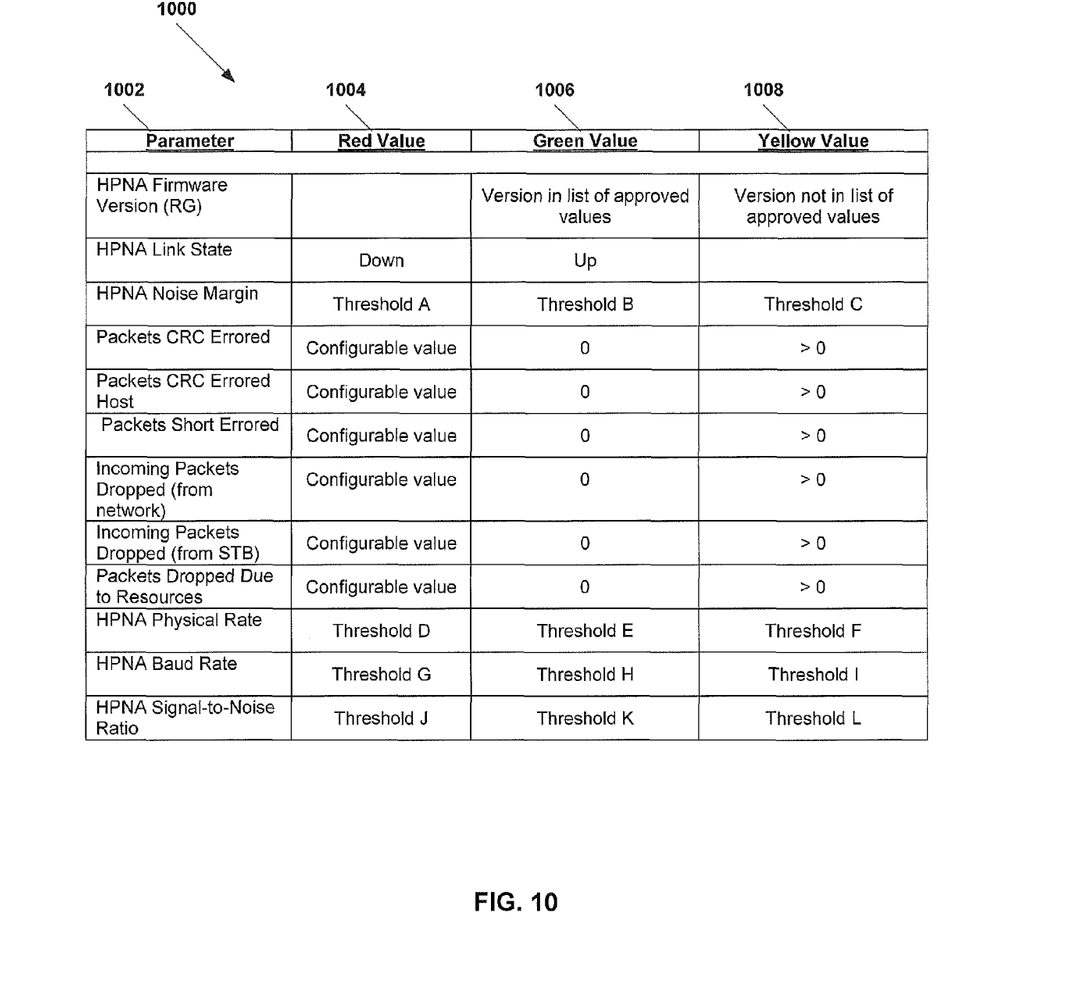
FIG. 10 is a diagram of a second particular embodiment of a data structure related to indicating quality of service.

In another particular illustrative embodiment, the RG 108 stores a plurality of parameters, such as home network performance parameters, that indicate a performance status of the home network 110. A data structure illustrating examples of such parameters is illustrated in FIG. 10. The RG 108 monitors bypassing traffic to determine and stores values of each of the home network performance parameters on a rolling basis and can locally store values related to a particular time interval. Further, the RG 108 can select a color from a plurality of colors based on at least one of the home network performance parameter values. In one embodiment, the color can indicate a category of overall performance of the home network 110. Categories of video content quality can correspond to a degree to which viewing of video content at a display device 112 coupled to the set-top box device 106 is impaired; a degree to which audio at a VoIP phone is impaired; a degree to which Internet service to a computer is impaired; a degree to which the quality of other network services is impaired; or any combination thereof The RG 108 can send data indicating home network performance to the set-top box device 102 in response to a request received at the set-top box device 102 from a viewer or technician. The set-top box device can send a graphical indicator of home network performance including the selected color to the display device 112. The graphical indicator can be selectable to view a graphical user interface indicating home network performance parameters, values, or any combination thereof, that are within ranges that trigger a graphical indicator associated with home network performance that is other than good.

In a particular embodiment, the RG 108 can receive a polling message or other request from the remote management system 118 for data related to performance of the home network 110. The RG 108 can send data indicating overall performance, data indicating values of home network performance parameters, data indicating a color selected at the RG 108, or any combination thereof, to the remote management system 118. In one embodiment, the remote management system 118 can select a color based on home network performance parameter values received from the RG 108. In another embodiment, the remote management system 118 can receive data indicating a color selected by the RG 108.

In an illustrative embodiment, a graphical home network performance indicator can be displayed at a display device that is coupled to the remote management system 118 or that communicates with the remote management system 118 via the private IP network, the IPTV access network, or the public Internet. For example, the remote management system 118 can send a graphical user interface (GUI) that includes the graphical home network performance indicator having the selected color to the technician computer 120 in response to a request for the GUI.

Figure 2:
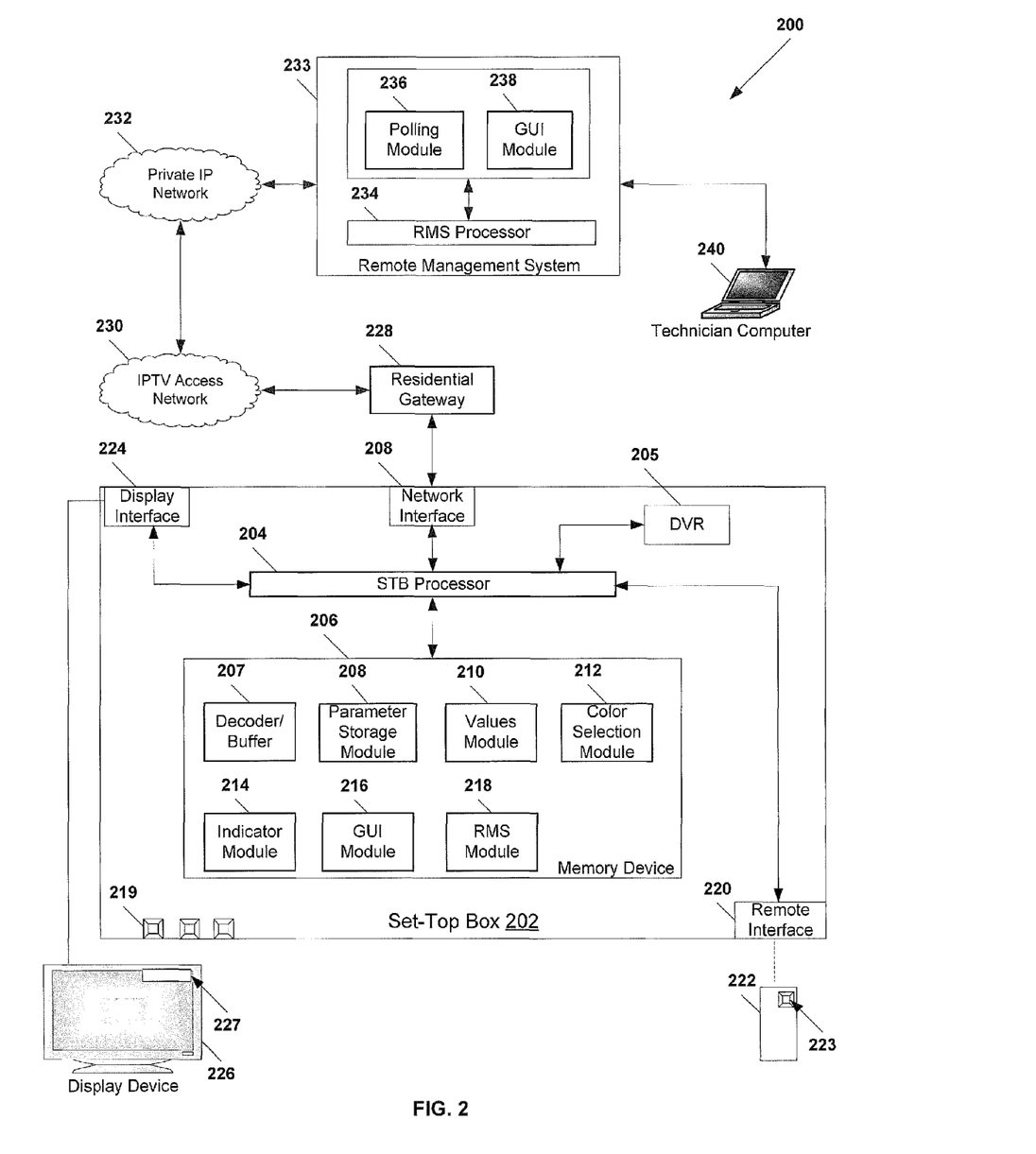
FIG. 2 is a block diagram of a second particular embodiment of a system to indicate quality of service.

Referring to FIG. 2, a block diagram of a second particular embodiment of a system to indicate quality of service is illustrated and designated generally 200. The system includes a set-top box device 202 communicating with a remote management system 233. In an illustrative embodiment, the set-top box device 202 can communicate with an Internet Protocol Television (IPTV) access network 230, and the remote management system 233 can communicate with the IPTV access network 230 via a private IP network 232.

In a particular embodiment, the set-top box device 202 can include a processor 204 and a memory device 206 accessible to the processor 204. Further, the processor 204 can communicate with a remote control device 222 via a remote interface 220. In addition, the processor 204 can also communicate with a display device 226 via a display interface 224. The processor 204 can be coupled to a network interface 208 that communicates with a residential gateway 228 or other customer premise equipment. The residential gateway 228 facilitates communication between the set-top box device 202 and the IPTV access network 230. In an illustrative embodiment, the set-top box device 206 can include one or more light-emitting indicators 219.

In the embodiment illustrated in FIG. 2, the memory device 206 can store instructions that are executable by the processor 204 to perform various functions of the set-top box device 202. Such instructions are represented as modules 208-218 and can be embodied in one or more operating systems, applications or other computer programs. In alternative embodiments, one or more of the functions provided by the modules 208-218 may be implemented using hardware logic.

In a particular embodiment, the memory device 206 can include a decoder/buffer 207 that decodes video data received at the set-top box device 202 and buffers video content to prevent underflow to the display device 212. In addition, the memory device 206 can include a parameter storage module 208 that stores a plurality of video quality parameters and values determined by the set-top box device 206 for such video quality parameters. An example of a data structure to store video quality parameters and related values is illustrated in FIG. 8.

Further, the memory device 206 can include a values module 210 that is executable by the processor 204 to determine values of the video quality parameters stored at the parameters storage module 208. For example, the values module 210 can be executable by the processor 204 to record utilization percentages for the processor 204, numbers of packet loss events at the set-top box device 202, whether the DVR 205 allows new recordings, and other values of video quality parameters. In an illustrative embodiment, the values module can be executable by the processor 204 to record video quality parameter values on a rolling basis and to store values related to a particular period of time, such as twenty-four hours, one day, or another period. Alternatively, values can be stored in relation to a particular number of prior video streams received at the set-top box device 202.

In an illustrative embodiment, the values module 208 can be executable by the processor 204 to receive configuration data related to the collection and storage of video quality parameter values. For example, aspects of determining values for the video quality parameters, including video quality parameters, value determination intervals, rolling storage periods, how and when values of one or more parameters are reset, other aspects of determining such values, or any combination thereof, can be configurable by the viewer, the technician, an IPTV service provider, or any combination thereof.

In a particular embodiment, the memory device 206 can include a color selection module 212 that is executable by the processor 204 to select a color from a plurality of colors based on at least one of the video quality parameter values. In one embodiment, the color can indicate a category of overall quality of video content received via the IPTV access network 230. Categories of video content quality can correspond to a degree to which viewing of video content at the display device 226 is impaired.

In a particular embodiment, the color selection module 212 can be executable by the processor 204 to select a first color (e.g., green) indicating a first video quality or other quality of service category; a second color (e.g., red) indicating a second video quality or other quality of service category; or a third color (e.g., amber or yellow) to indicate a third video quality or other quality of service category. In an illustrative embodiment, a color indicating good video quality can be selected at all times except when one or more particular video quality parameter values are within a pre-defined yellow or red range.

Categorizations of video quality corresponding to various colors can be pre-defined within software stored at the set-top box device 202. In another embodiment, categorizations of video quality based on video quality parameter values can be configurable for the set-top box device 202, for a geographic area including the set-top box device 202, for another plurality of set-top box devices, or any combination thereof.

In a particular embodiment, the memory device 206 can include an indicator module 214 that is executable by the processor 204 to activate a video quality indicator that includes the selected color. For example, the indicator module 214 can be executable by the processor 204 to activate a light-emitting indicator, such as one of a plurality of video quality indicators 219, at the set-top box device 202 in the selected color. In an illustrative embodiment, a first one of the plurality of light-emitting indicators 219 can be illuminated when the selected color is green, a second one when the selected color is yellow, or a third one when the selected color is red.

In another example, the indicator module 214 can be executable by the processor 204 to send an instruction to the remote control device 222 to illuminate a light-emitting video quality indicator 223 at the remote control device 222 in the selected color. In still another example, the indicator module 214 can be executable by the processor 204 to send a graphical video quality indicator 227 including the selected color to the display device 226. The indicator module 214 can be executable by the processor 204 to send the graphical video quality indicator 227 in the selected color to the display device 226 with video content, such that the graphical video quality indicator 227 is shown at a corner of the screen.

In a particular embodiment, the memory device 206 can include a graphical user interface (GUI) module 216 that is executable by the processor 204 to send various graphical user interfaces to the display device 226 in response to inputs received, for instance, via the remote control device 222. In an illustrative embodiment, where the graphical video quality indicator 227 does not indicate good video quality, the indicator module 214 can be executable by the processor 204 to receive a selection of the graphical video quality indicator 227. In response to such a selection, the GUI module 216 can be executable to send a graphical user interface indicating video quality parameters, values, or any combination thereof, that are within ranges that trigger a red or yellow video quality indicator, for instance. An example of such a graphical user interface is illustrated in FIG. 9.

In another embodiment, the GUI module 216 can be executable by the processor 204 to send a graphical system menu to the display device 226 in response to request for the system menu received from the remote control device 222. The graphical system menu can include a selectable indicator of an option to check video quality status. The GUI module 216 can be executable by the processor 204 to send the graphical video quality indicator 227, a graphical user interface indicating reasons for a yellow or red graphical video quality indicator, or any combination thereof, to the display device 226 in response to a selection of the option to check video quality status via the system menu.

In a particular embodiment, the memory device 206 can include a remote management system (RMS) module 218 that is executable by the processor 204 to communicate data regarding video quality parameter values to the remote management system 233. In an illustrative embodiment, the remote management system 233 can include a polling module 236 that is executable by processing logic 234 at the remote management system 233 to send a polling message to the set-top box device 202 requesting data related to video quality or other quality of service received at the set-top box device 202 via the IPTV access network 230.

The RMS module 218 can be executable by the set-top box processor 204 to send data indicating overall video quality, data indicating values of video quality parameters, data indicating a color selected at the set-top box device, or any combination thereof, to the remote management system 233. In an illustrative embodiment, the remote management system 233 can include a GUI module 238 executable by the remote management system processing logic 234 to send a video quality indicator to a display device, such as a technician computer 240, which is coupled to the remote management system 233. For example, the GUI module 238 can be executable by the remote management system processing logic 234 to send a graphical user interface (GUI) that includes a video quality indicator having the selected color to the technician computer 240. In one embodiment, the remote management system 233 can select the color based on video quality parameter values received from the set-top box device 202. In another embodiment, the remote management system 233 can receive data indicating a color selected by the set-top box device 202.

Figure 3:
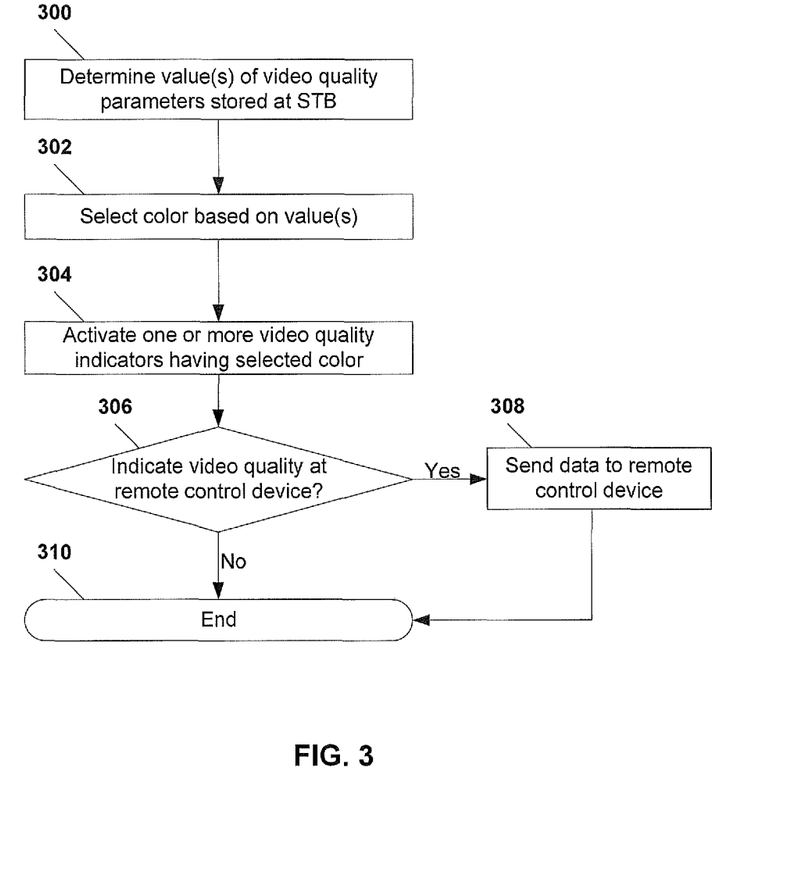
FIG. 3 is a flow diagram of a particular embodiment of a method of indicating quality of service.

Referring to FIG. 3, a flow diagram of a particular embodiment of a method of indicating quality of service is illustrated. At block 300, a set-top box device determines one or more value of one or more of a plurality of video quality parameters stored at the set-top box device. Moving to block 302, the set-top box device selects a color based on the determined value(s). Proceeding to block 304, in a particular embodiment, the set-top box device activates a light-emitting video quality indicator in the selected color at the set-top box device. Continuing to decision node 306, the set-top box device can determine whether to activate a light-emitting indicator at a remote control device communicating with the set-top box device. If the set-top box device determines that the light-emitting video quality indicator at the remote control device is to be illuminated in the selected color, the method advances to block 308, and the set-top box device can send data indicating a video quality, a selected color, or a combination thereof to the remote control device. The method terminates at 310.

Figure 4:
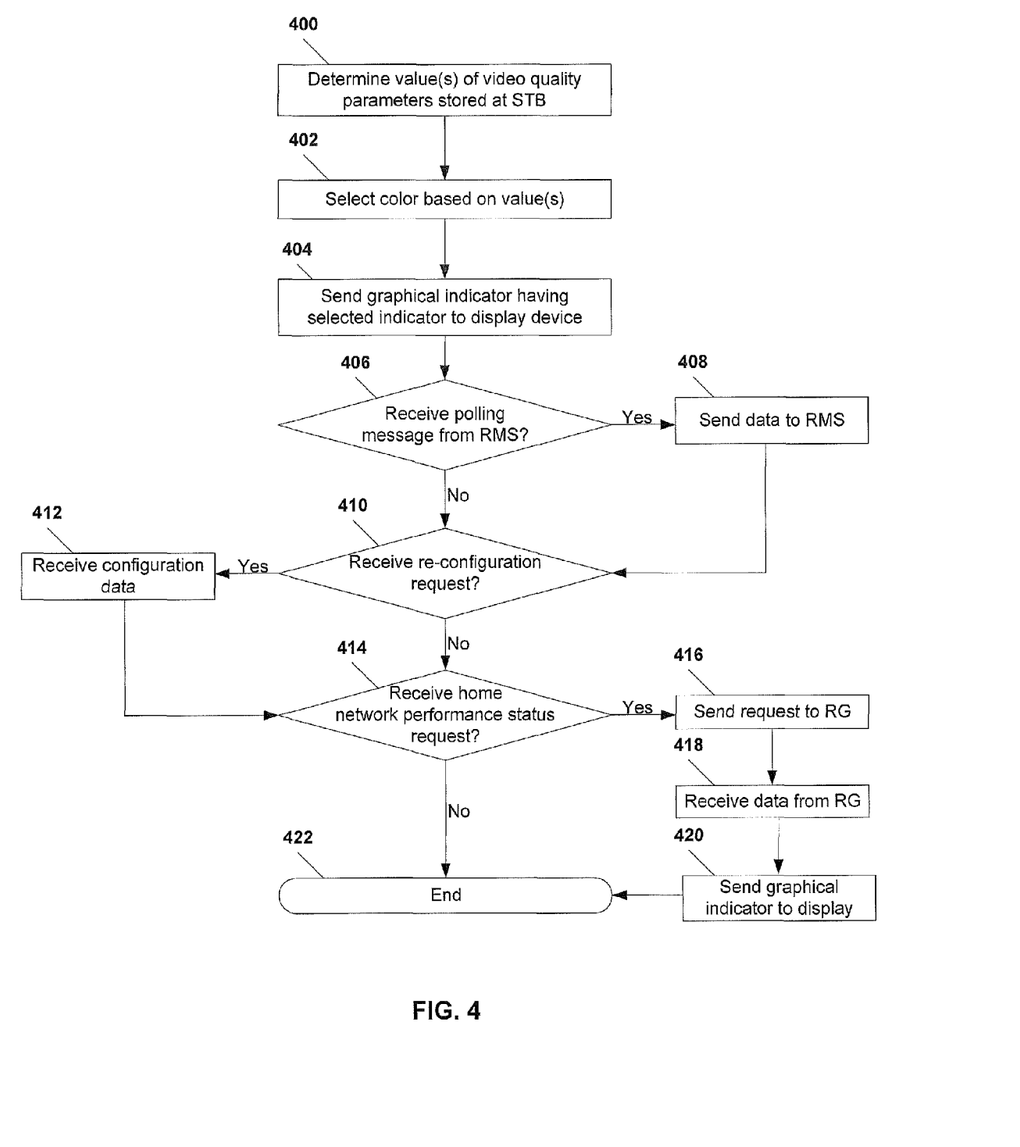
FIG. 4 is a flow diagram of a second particular embodiment of a method of indicating quality of service.

Referring to FIG. 4, a flow diagram of a second particular embodiment of a method of indicating quality of service is illustrated. At block 400, a set-top box device determines one or more value of one or more of a plurality of video quality parameters stored at the set-top box device. Moving to block 402, the set-top box device selects a color based on the determined value(s). Proceeding to block 404, in a particular embodiment, the set-top box device sends a graphical video quality indicator that includes the selected color to a display device coupled to the set-top box device.

Continuing to decision node 406, the set-top box device can determine whether it has received a polling message or other request from a remote management system for data indicating video quality or other quality of service at the set-top box device. If the set-top box device has not received such a request, the method moves to decision node 410. Conversely, if the set-top box device determines that it has received such a request, the method advances to block 408, and the set-top box device can send data indicating a video quality, values of one or more video quality parameters, a selected color indicating video quality, or any combination thereof, to the remote management system. The method then moves to decision node 410.

In an illustrative embodiment, at decision node 410, the set-top box device can determine whether it has received a request to re-configure video quality parameter values, or ranges of video quality parameter values, which cause a particular color related to video quality to be selected. If the set-top box device has received such a request, the set-top box device can receive configuration data, at block 412.

Proceeding to decision node 414, in a particular embodiment, the set-top box device determines whether it has received a request for an indication of performance of a home network to which the set-top box device is coupled. If the set-top box device has received such a request, the method moves to block 416, and the set-top box device sends a request to a residential gateway coupled to the home network for performance data. At block 418, the set-top box device receives the performance data. In an illustrative embodiment, the data can include values of one or more home network performance parameters and a color indicating home network performance. Moving to block 420, the set-top box device sends a graphical indicator having the selected color indicating home network performance to the display device coupled to the set-top box device. The graphical indicator of home network performance may be displayed with or without a graphical indicator of video quality. The method terminates at 422.

Figure 5:
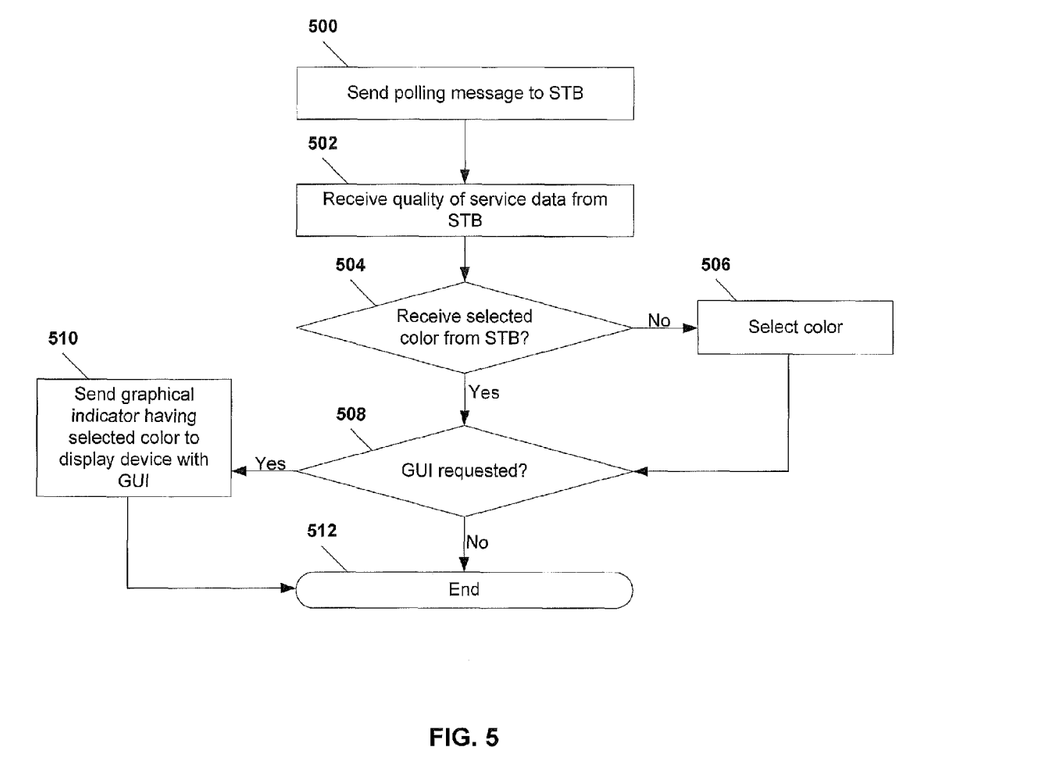
FIG. 5 is a flow diagram of a third particular embodiment of a method of indicating quality of service.

Referring to FIG. 5, a flow diagram of a second particular embodiment of a method of indicating quality of service is illustrated. At block 500, a remote management system sends a polling message to a set-top box device. The polling message includes a request for data related to video quality or other quality of service received at the set-top box device via a video distribution network, such as an Internet Protocol Television (IPTV) network. Moving to block 502, the remote management system receives quality of service data from the set-top box device, such as data indicating a quality of service, data indicating values of one or more quality of service parameters, a selected color indicating a quality of service, or any combination thereof.

Proceeding to decision node 504, in a particular embodiment, the remote management system can determine whether it has received data indicating a selected color from the set-top box device. If the remote management system determines that it has received data indicating a selected color from the set-top box device, the method advances to decision node 508. On the other hand, if the remote management system determines that it has not received data indicating a selected color from the set-top box device, the method moves to block 506, and the remote management system can select a color indicating a quality of service based on data received from the set-top box device, such as data indicating values of one or more quality of service parameters. The method then moves to decision node 508.

At decision node 508, in an illustrative embodiment, the remote management system can determine whether it has received a request for a graphical user interface (GUI) indicating a quality of service received at the set-top box device or at a plurality of set-top box devices that includes the set-top box device. If the remote management system determines that it has received a request for such a GUI, the method proceeds to block 510, and the remote management can send the requested GUI to a requesting device, such as a computing device operated by a technician or network service provider. The GUI can include, for example, a graphical indication of the quality of service received at the set-top box device, where the graphical indication includes a color indicating the quality of service. Further, the GUI can include values of quality of service parameters that have been determined to cause a quality of service other than a good quality of service. The method terminates at 512.

Figure 6:
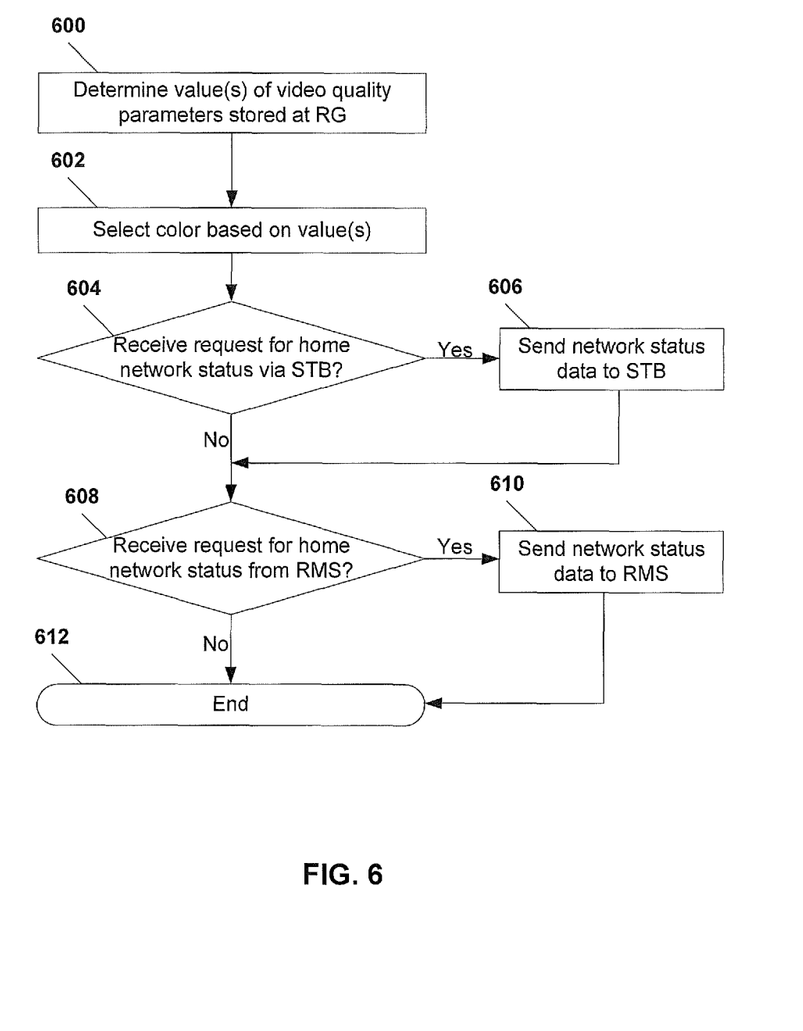
FIG. 6 is a flow diagram of a fourth particular embodiment of a method of indicating quality of service.

Referring to FIG. 6, a flow diagram of a fourth particular embodiment of a method of indicating quality of service is illustrated. At block 600, a residential gateway determines one or more value of one or more of a plurality of home network performance parameters stored at the set-top box device. Moving to block 602, the residential gateway selects a color based on the determined value(s). Proceeding to decision node 604, the residential gateway determines whether it has received a request from a set-top box device for an indication of home network performance. If the residential gateway has not received such a request, the method advances to decision node 608. Whereas, if the residential gateway has received a request for an indication of home network performance, the method moves to block 606, and the residential gateway sends network performance data to the set-top box device. The method then proceeds to decision node 608.

At decision node 608, the residential gateway can determine it has received a polling message or similar request from a remote management system. If the residential gateway has received such a request, the method moves to block 610, and the residential gateway sends network performance data to the remote management system. The method terminates at 612.

Referring to FIG. 7, a flow diagram of a fifth particular embodiment of a method of indicating quality of service is illustrated. At block 700, a remote management system sends a polling message to a residential gateway. The polling message includes a request for data related to home network performance, quality of one or more services received via the home network, or any combination thereof. Moving to block 702, the remote management system receives home network performance data from the residential gateway.

Proceeding to decision node 704, in a particular embodiment, the remote management system can determine whether it has received data indicating a selected color, such as a color indicating home network performance, from the residential gateway. If the remote management system determines that it has received data indicating a selected color from the residential gateway, the method advances to decision node 708. On the other hand, if the remote management system determines that it has not received data indicating a selected color from the set-top box device, the method moves to block 708, and the remote management system can select a color indicating home network performance based on data received from the residential gateway, such as data indicating values of one or more home network performance parameters. The method then moves to decision node 708.

At decision node 708, in an illustrative embodiment, the remote management system can determine whether it has received a request for a graphical user interface (GUI) indicating a quality of service received at the set-top box device or at a plurality of set-top box devices that includes the set-top box device. If the remote management system determines that it has received a request for such a GUI, the method proceeds to block 710, and the remote management can send the requested GUI to a requesting device, such as a computing device operated by a technician or network service provider. The GUI can include a graphical indication of home network performance, where the graphical indication includes the selected color. Further, the GUI can include values of home network performance parameters that have been determined to cause a quality of service other than a good quality of service. The method terminates at 712.

The methods described herein can be performed as presented. Alternatively, those skilled in the art will appreciate that certain aspects of the methods can be performed concurrently or in sequences not presented without departing from the scope of the disclosure. For example, in some embodiments, one or more video quality indicators can be activated before, after, or concurrently with sending data to a remote management system.

Referring to FIG. 8, a diagram of a particular embodiment of a data structure related to indicating quality of service is illustrated and designated generally 800. The data structure 800 can be stored at a set-top box device and can include a plurality of video quality parameters 802. In addition the data structure can include values or ranges of values for each of the video quality parameters 802 that are associated with various categories of video quality. For example, the data structure 800 can indicate red values 804, where an occurrence of one or more red values causes a set-top box device or remote management system to determine that video quality at the set-tap box device is poor and to activate a red video quality indicator or other video quality indicator associated with poor video quality. Further, the data structure 800 can indicate green values 806, where an occurrence of all green values causes the set-top box device or remote management system to determine that video quality at the set-top box device is good and to activate a green video quality indicator or other video quality indicator associated with good video quality. In addition, the data structure 800 can indicate yellow values 808, for example, where an occurrence of one or more yellow values causes the set-top box device or remote management system to determine that video quality at the set-top box device is neither good, nor poor, and to activate a yellow video quality indicator or other video quality indicator associated with video quality that is neither good, nor poor.

Referring to FIG. 9, a diagram of a particular embodiment of a graphical user interface (GUI) related to indicating quality of service is illustrated and designated generally 902. The GUI 902 can be provided to a display device coupled to a set-top box device of a viewer or at a display device of a computing device of a technician or network service provider. In an illustrative embodiment, the GUI 902 can be provided in response to a selection of a graphical video quality indicator. In another illustrative embodiment, the GUI 902 can be provided in response to a selection to view the GUI 902 from a menu.

The GUI 902 includes an identification 904 of one or more set-top box devices. In an illustrative embodiment, the identification can be an Internet Protocol (IP) address. Further, the GUI 902 includes a current video quality status indicator 906, which may include a color corresponding to a particular category of video quality (e.g., red), text corresponding to a particular category of video quality (e.g., "Poor"), or a combination thereof. In a particular embodiment, the GUI 902 can include values 908 of one or more video quality parameters based on which an indicator of video quality other than good was selected.

Referring to FIG. 10, a second particular embodiment of a data structure related to indicating quality of service is illustrated and designated generally at 1000. The data structure 1000 can be stored at a residential gateway and can include a plurality of home network performance parameters 1002. In addition the data structure can include values or ranges of values for each of the home network performance parameters 1002 that are associated with various categories of home network performance. For example, the data structure 1000 can indicate red values 1004, where an occurrence of one or more red values causes the residential gateway, a set-top box device coupled to the residential gateway, or a remote management system communicating with the residential gateway to determine that home network performance is poor and to activate a red home network performance indicator or other home network performance indicator associated with poor home network performance. Further, the data structure 1000 can indicate green values 1006, where an occurrence of all green values causes the residential gateway, set-top box device or remote management system to determine that home network performance is good and to activate a green home network performance indicator or other home network performance indicator associated with good home network performance. In addition, the data structure 1000 can indicate yellow values 1008, for example, where an occurrence of one or more yellow values causes the residential gateway, set-top box device or remote management system to determine that home network performance is neither good, nor poor, and to activate a yellow home network performance indicator or other home network performance indicator associated with home network performance that is neither good, nor poor.

Figure 11:
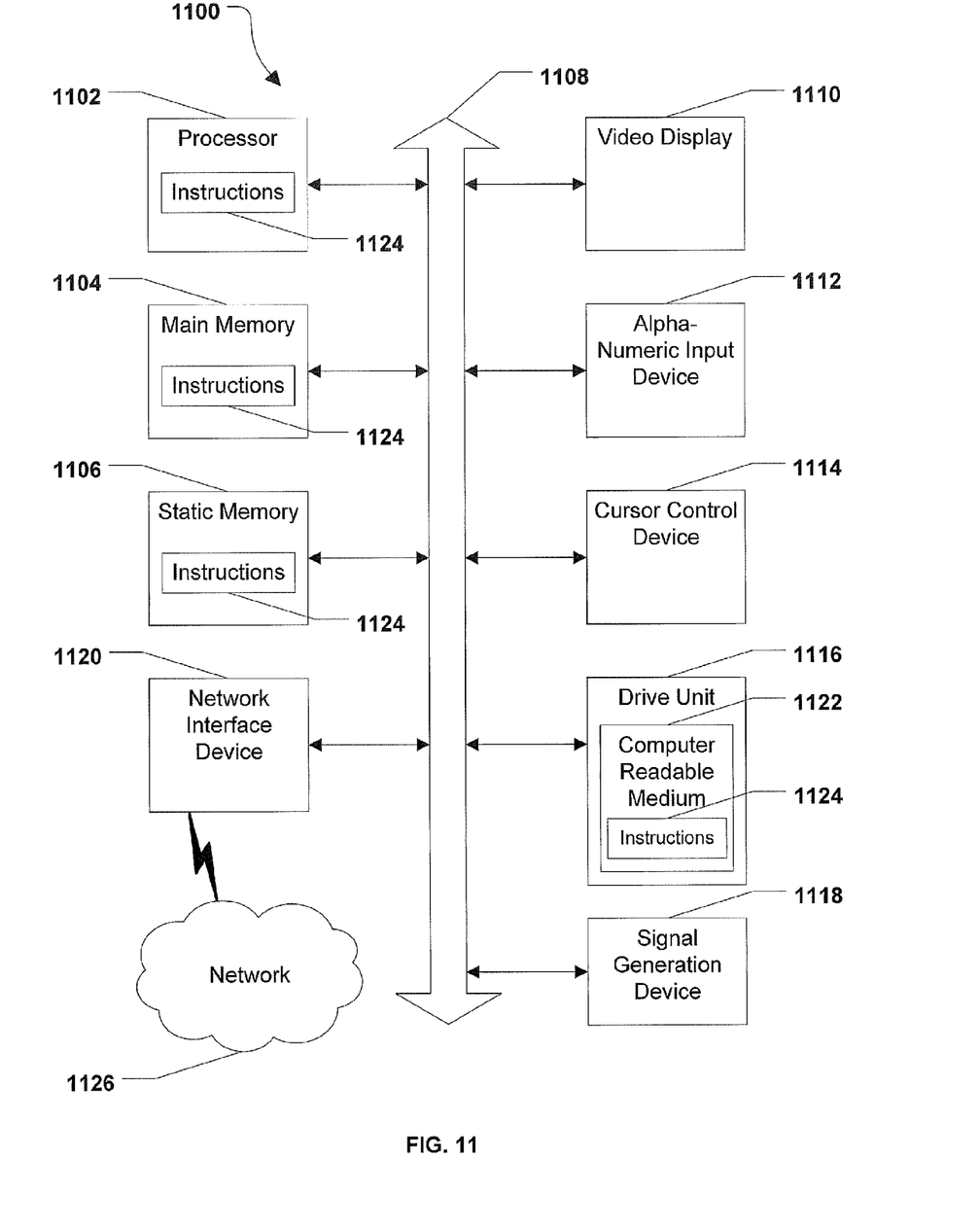
FIG. 11 is a diagram of an illustrative embodiment of a general computer system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices, such as a residential gateway, set-top box device or remote management system, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    sending a polling message from a management system to a set-top box device, wherein the polling message requests service data related to quality of service associated with the set-top box device;
    receiving, at the management system, quality parameters from the set-top box device in response to the polling message;

determining whether the quality parameters include an indication of a representative color corresponding to the quality of service;

selecting, at the management system, the representative color based on the quality parameters in response to a determination that the quality parameters do not include the indication of the representative color; and sending a quality indicator from the management system to a display device, wherein the quality indicator includes the representative color and an identification of the set-top box device.

2. The method of claim 1, further comprising displaying an indication that an account associated with the set-top box device is suspended.

3. The method of claim 1, wherein the quality parameters include a parameter that indicates whether a memory capacity of the set-top box device allows new recordings to be stored.

4. The method of claim 1, wherein the quality parameters include a parameter that indicates an internet protocol television client version.

5. The method of claim 1, wherein the quality parameters include a parameter that indicates a number of decoder buffer overflow events.

6. The method of claim 1, wherein the quality parameters include a parameter that indicates a number of decoder buffer underflow and rebuffering events.

7. The method of claim 1, wherein the quality parameters include a parameter that indicates a stream discontinuity count.

8. The method of claim 1, wherein the quality parameters include a parameter that indicates a utilization of a processor of the set-top box device, an internet protocol address of the set-top box device, or a combination thereof.

9. The method of claim 1, wherein the representative color is selected from a plurality of colors, wherein a first color of the plurality of colors is associated with a first quality of service based on a first user input, wherein a second color of the plurality of colors is associated with a second quality of service based on a second user input, and wherein the second color is distinct from the first color.

10. The method of claim 1, wherein the quality indicator provides reasons for a rating of the quality of service.

11. A system comprising:
a processor; and
a memory, wherein the memory includes instructions executable by the processor to perform operations comprising:
sending a polling message to a set-top box device, wherein the polling message requests service data related to quality of service associated with the set-top box device;
receiving data from the set-top box device in response to the polling message;
determining whether the data includes an indication of a representative color corresponding to the quality of service;
selecting the representative color based on the data in response to a determination that the data does not include the indication of the representative color; and
sending a quality indicator to a display device, wherein the display device displays the representative color and an identification of the set-top box device.

12. The system of claim 11, wherein the display device comprises a display screen of a computer that is remotely located from the system, and wherein the computer is distinct from the set-top box.

13. The system of claim 12, wherein the polling message is initiated by a user of the computer.

14. The system of claim 11, wherein the data includes information pertaining to a reason related to the quality of service.

15. The system of claim 14, wherein the quality indicator includes a details section that presents the information.

16. The system of claim 11, further comprising a network interface to communicate with a video distribution network.

17. The system of claim 11, wherein the quality indicator is sent to the device display as a part of a graphical user interface.

18. A computer-readable storage device comprising instructions executable by a processor to perform operations including:
sending a polling message to a set-top box device, wherein the polling message requests service data related to quality of service associated with the set-top box device;
receiving data from the set-top box device in response to the polling message;
determining whether the data includes an indication of a representative color corresponding to a quality of service rating;
selecting the representative color based on the data in response to a determination that the data does not include the indication of the representative color; and
sending a quality indicator to a display device, wherein the display device presents the representative color and an identification of the set-top box device.

19. The computer-readable storage device of claim 18, wherein the quality indicator includes a detail section that provides reasons for the quality of service rating, and wherein information included in the detail section is received as part of the data in response to the polling message.

20. The computer-readable storage device of claim 18, wherein the representative color is selected from a plurality of colors, wherein a particular color of the plurality of colors is associated with a particular quality parameter of the quality parameters.

* * * * *